Oct. 7, 1969

H. J. CAULFIELD 3,471,802

MODULATED LASER USING A SOLID FABRY-PEROT
ETALON HAVING A BIREFRINGENT CENTER CORE

Filed Feb. 1, 1967

INVENTOR

HENRY JOHN CAULFIELD

Harold E. Meier

ATTORNEY

United States Patent Office 3,471,802
Patented Oct. 7, 1969

3,471,802
MODULATED LASER USING A SOLID FABRY-PEROT ETALON HAVING A BIREFRINGENT CENTER CORE
Henry John Caulfield, Richardson, Tex., assignor to Texas Instruments Incorporated, Dallas, Tex., a corporation of Delaware
Filed Feb. 1, 1967, Ser. No. 613,316
Int. Cl. H01s 3/10
U.S. Cl. 331—94.5     6 Claims

ABSTRACT OF THE DISCLOSURE

A modulated laser having an active material capable of producing coherent light as atomic particles return from a high energy level to a lower energy level, with means at opposite ends of said active material for biasing the polarization of the laser light. A mirror reflects the laser light from one end of the active material, and an optical switch changes the polarization axis of the laser light in accordance with a modulating signal. The polarized light is transmitted through a solid Fabry-Perot etalon during the pulsing polarization and reflected during the operating polarization.

BACKGROUND OF THE INVENTION

The basic operation and construction of lasers has been described in numerous articles and patents. For example, laser operation and theory is described by Vogel et al. in the technical publication, Electronics, October 27, 1961, pages 40–47, and by Boyd et al. in Physical Review Letters, April 1, 1962, pages 269–272. To understand the present invention only a brief description of laser operation is believed necessary. In general, a laser includes an active material that produces coherent light by returning atomic particles from a high energy level to a lower energy level. The laser light is polarized along a preferred axis, as by use of Brewster windows, and reflected between two opposing mirrors positioned at opposite ends of the active material. A switching device modulates the light output of the laser, usually by changing the polarization axis of the coherent light.

Heretofore, the energy output from the laser cavity has been transmitted through one of the opposing mirrors which is partially reflective. The partially reflective mirror approach to extracting energy from the laser cavity permits use of only a small percentage of the total power available; therefore, this approach can only be used for low power applications. Others have proposed using electro-optic switches in conjunction with a birefringent device located in the light beam to rotate the polarization axis to cause the light beam to bypass the reflecting mirror.

SUMMARY OF INVENTION

The present invention uses a birefringent solid Fabry-Perot etalon as an end reflective surface; it is an improvement over the prior art in that it operates at any natural laser wavelength and extracts a high percentage of the power available in the laser cavity. It is the first modulated laser that does not trade-off high power operation with bandwidth operation, and vice versa. The laser of this invention employs a lasing material for the production of coherent light; the light is polarized along a preferred axis and reflected by an end mirror. An electro-optic switch varies the polarization axis of the laser light, thus controlling the transmission through a birefringent solid etalon employed as the second end-mirror.

A better understanding of the invention and its advantages will be apparent from the following specification and claims and from the accompanying drawing illustrative of the invention.

THE DRAWINGS

Figure 1:
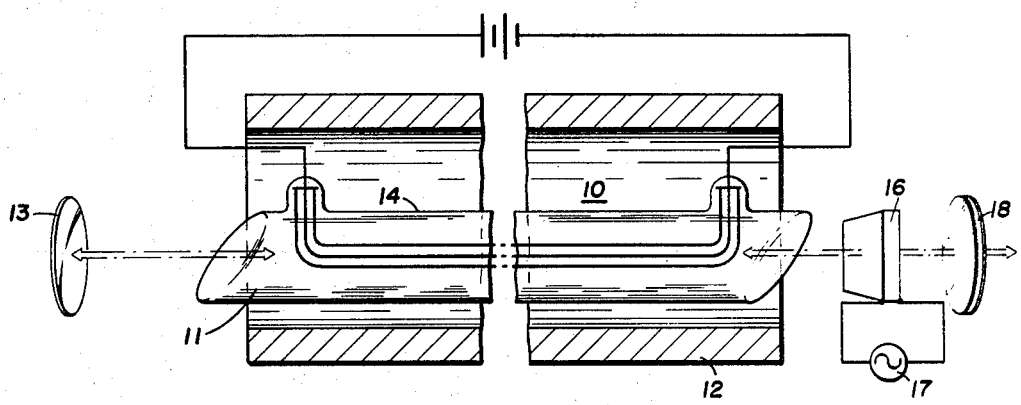
Figure 3:
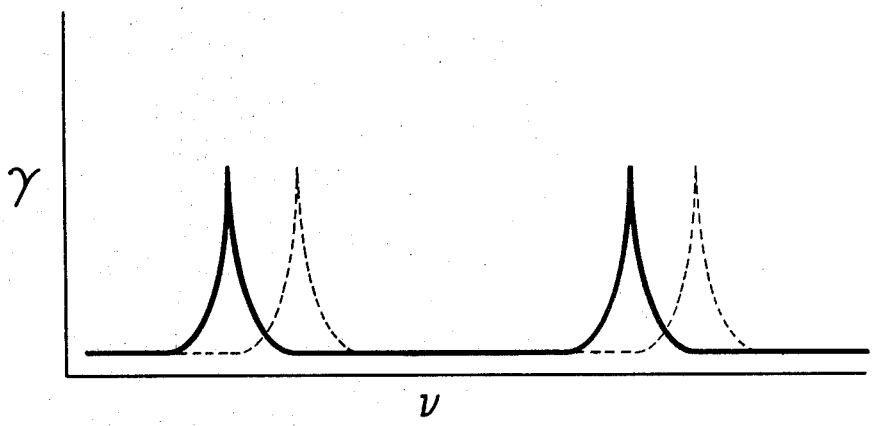
Figure 2:
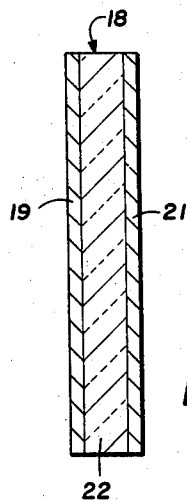

FIGURE 1 is a diagrammatic elevation view of a laser embodying the invention for producing coherent radiation with controlled modulation;
FIGURE 2 is a cross section of a solid etalon; and
FIGURE 3 is a curve of etalon transmission versus wavelength.

THE PREFERRED EMBODIMENT

Referring now to FIGURE 1, there is shown apparatus 10 for producing coherent radiation, i.e., a laser. The laser 10 includes an active lasing material 11 having at least two energy levels, and preferably more, each separated by an amount corresponding to a characteristic frequency. The laser 10 also includes a pumping source 12 for exciting the ions of the active material into higher energy levels. In the embodiment shown, an optically reflecting surface 13 is positioned from the left end of a tube 14 which contains the active material 11. At the right end of the tube 14, in the path of coherent light produced by the active material 11, there is positioned an electro-optic switch 16 connected to a source of modulating voltage 17. The function of the electro-optic switch 16 is to control the light output from the laser cavity, as will be explained later. Positioned to the right of the electro-optic switch 16 is a birefringent solid Fabry-Perot etalon 18 having the property of transmitting light polarized in one direction and reflecting light polarized along any other axis.

Referring to FIGURE 2, there is shown the solid Fabry-Perot etalon 18 having parallel plane reflectors 19 and 21 which have very high reflectance, greater than 90%, with very low losses. The usual method of forming a solid Fabry-Perot etalon is by depositing multidielectric layers on opposite surfaces of an optical center core 22. Optical quartz is one material which has been used for the center core 22 and exhibits particularly advantageous features as a birefringent solid etalon. However, care must be exercised when using quartz since it is necessary to cut it at an angle such that the optical activity is zero. Mica also exhibits properties which make it suitable for use as the center core of a birefringent solid etalon. Other materials also show promise as etalon core material, the only limitation is that the material exhibit large linear birefringence.

Solid Fabry-Perot etalons having perfectly parallel reflectors will transmit the coherent light from the active material 11 whenever the etalon length is equal to an integral number of half-wavelengths in the material of the core 22. Mathematically this is given by the equation:

$$2L = m\lambda_0/n \quad (1)$$

where $L$ is the spacing between the reflectors 19 and 21, $m$ is the number of wavelengths contained in $L$, $\lambda_0$ is the free-space wavelength, and $n$ is the index of refraction of the etalon material. Thus, any desired wavelength can be transmitted through a solid etalon merely by varying the distance between the reflectors 19 and 21, that is, the length $L$ of the center core 22. If the reflecting surfaces 19 and 21 are not perfectly parallel, only those surfaces that are parallel will transmit the laser light; this does not present a problem since the state of the art is such that parallel surfaces are not difficult to obtain.

At the wavelength for which the etalon is designed, the transmission of light therethrough is given by the equation:

$$\gamma = \frac{1}{1 + [4R/(1-R)^2] \sin^2 (2\pi nL \cos \theta/\lambda_0)} \quad (2)$$

where $R$ is the reflectivity of the reflective surfaces 19 and 21, $\lambda_o$ is the free-space wavelength of the incident radiation, and $\theta$ is the angle between the incidence direction and the normal to the reflecting surfaces.

From Equation 1 it can be shown that the pass bands of a Fabry-Perot etalon can be tuned over the full spectral range by varying the length L of the core material 22 by an amount equal to the free-space wavelength divided by two. Thus, the transmitted wavelength of an etalon can be varied by controlling the length L to within a small fraction of a micron. Because the mode number $m$, which is the number of wavelengths contained in L, refer to Equation 1, is temperature dependent, it can be shown that an etalon can be thermally tuned to pass any desired wavelength. If Equation 1 is rewritten as follows:

$$m = 2Ln/\lambda_o \qquad (3)$$

and differentiated, then:

$$d(m) = \frac{2Ln}{\lambda_o}\left(\frac{1}{L}\frac{dL}{dT} + \frac{1}{n}\frac{dn}{dt}\right)dT \qquad (4)$$

The first term in the parentheses of the above equation is the thermal expansion coefficient of the etalon material and the second term shows the temperature dependence of the index of refraction $n$.

Considering then Equations 1, 2 and 4, it is apparent that a solid Fabry-Perot etalon is an ideal device as an end mirror for a laser cavity. At all wavelengths except those for which the etalon is designed, the reflection back through the active material 11 is greater than 90% as shown by the curve in FIGURE 3. The curve of FIGURE 3 also shows the narrow bandwidth transmission of a solid etalon at the desired wavelength. Any desired wavelength can be passed merely by thermal tuning.

A bi-refringent solid Fabry-Perot etalon has the additional feature of controlability of transmission by means of rotation of the plane of polarization. Referring to FIGURE 3, the solid curve shows the wavelengths passed by the etalon when the light beam is polarized along a predetermined axis; the dotted curve shows the second set of wavelengths passed by the etalon due to its bi-refringent properties. Thus, the etalon of the invention passes two sets of light wavelengths depending on the plane of polarization of the light. As mentioned previously, two materials which have bi-refringent properties are Mica and quartz (quartz must be cut at the proper angle). To dump the energy from the laser cavity when a bi-refringent solid etalon is employed as one end mirror, it is only necessary to rotate the plane of polarization of the light beam.

Control of the laser light transmission through the etalon 18 is by means of the electro-optic switch 16. The electro-optic switch 16 in turn is controlled from a voltage source 17 which is programmed to generate a signal that represents the information desired to be transmitted by the laser light. The state of the art of in-cavity electro-optic switches has advanced rapidly in recent years; many such devices are available and can be employed in the system shown in FIGURE 1. A particularly thorough description of presently available electro-optic switches is given in the article by J. P. Kaminow and E. H. Turner in Proceedings of the IEEE, volume 54, October 1966, pages 1374 to 1388.

A typical electro-optic switch includes an electro-optic body having a particular orientation relative to a preferred axis of polarization of the laser light. The electro-optic body is employed together with quarter-wave plates, also located in the laser cavity, to provide for a sensitive control of the laser light polarization. A modulation volttage applied to the electro-optic body causes a phase shift between the two components of the laser beam so that the polarization of the transmitted beam is elliptical. The quarter-wave plate means then restores plane polarization but at a polarization angle dependent upon the voltage applied to the electro-optic body.

In operation, the radiation produced by the active material 11 at a particular wave length is polarized along a preferred axis by the Brewster windows of the tube 14. The laser light then passes through the electro-optic switch 16 without changing the plane of polarization; that is, if the electro-optic switch is de-energized. The light beam, generated by the laser and polarized along a given axis by the Brewster windows, is almost totally reflected by the etalon 18, because in this plane of polarization, the etalon is designed to pass other wavelengths. In this mode of operation, none of the energy contained in the laser cavity is extracted therefrom. However, if the electro-optic switch 16 is energized from the source 17 with the half-wave voltage, the plane of polarization of the light beam will be rotated along the axis for which the etalon 18 was designed to transmit light at the wavelength produced by the laser 10. The energy is dumped from the laser cavity and the information contained therein used in an external system. By use of a solid Fabry-Perot etalon 18, substantially all of the energy of the laser cavity can be extracted therefrom.

It is to be understood that this invention is not limited to the use of either gaseous or solid state lasers. A bi-refringent etalon can be used at any natural laser wavelength and can be used with all known lasing materials including ruby, He-Ne, and $CO_2$.

While only one embodiment of the invention, together with modifications thereof, has been described in detail herein and shown in the accompanying drawing, it will be evident that various further modifications are possible in the arrangement and construction of its components without departing from the scope of the invention.

I claim:
1. A modulated laser which comprises:
    an active material capable of being excited into an inverted population condition for production of coherent light as atomic particles return from a higher energy level to a lower energy level;
    switching means located in the path of laser light to vary the plane of polarization of said light; and
    a solid etalon spaced from said switch away from said active material, said etalon having the property of passing the coherent light when polarized in one plane and reflecting the coherent light when polarized in any other plane.

2. A modulated laser which comprises:
    an active material capable of being excited into an inverted population condition for production of coherent light as atomic particles return from a higher energy level to a lower energy level, means at opposite ends of said active material for biasing the polarization of the coherent light toward a preferred polarization axis;
    a reflector positioned at one end of said active material;
    switching means located in the path of laser light to vary the plane of polarization of said light; and
    a solid etalon spaced from said switch away from said active material, said etalon having the property of passing the coherent light when polarized in one plane and reflecting the coherent light when polarized in any other plane.

3. The laser according to claim 2 wherein the etalon has large linear bi-refringence.

4. A modulated laser which comprises:
    an active material capable of being excited into an inverted population condition for production of coherent light as atomic particles return from a higher energy level to a lower energy level;
    means at opposite ends of said active material for biasing the polarization of the coherent light toward a preferred polarization axis;
    a mirror spaced from one end of said active material for reflecting the coherent light from said active material;

switching means spaced from the end of said active material opposite said mirror in the path of laser light to vary the polarization axis of said light; and a solid state etalon spaced from said switch away from said active material, said etalon having the property of passing the coherent light when said switching means is energized and reflecting the coherent light when said switch is de-energized.

5. The laser according to claim 4 wherein the etalon is of a mica material.

6. The laser according to claim 4 wherein the etalon is of a quartz material cut at an angle to eliminate optical activity.

References Cited

UNITED STATES PATENTS

| | | |
|---|---|---|
| 3,134,837 | 5/1964 | Kisliuk et al. |
| 3,229,223 | 1/1966 | Miller. |
| 3,243,724 | 3/1966 | Vuylsteke. |
| 3,277,392 | 10/1966 | Nicolai. |
| 3,327,243 | 6/1967 | Stickley. |
| 3,339,073 | 8/1967 | Hunter. |
| 3,356,438 | 12/1967 | Macek et al. |
| 3,395,960 | 8/1968 | Chang et al. |

OTHER REFERENCES

Billings: "A Birefringent Frustrated Total Reflection Filter," Journal of the Optical Society of America, vol. 40, July 1950, pp. 471–76.

JEWELL H. PEDERSEN, Primary Examiner

E. BAUER, Assistant Examiner

U.S. Cl. X.R.

332—7.51; 350—150, 157, 166